Jan. 15, 1957 B. E. O'CONNOR 2,777,544
FREQUENCY SENSITIVE MECHANICAL DAMPING SYSTEM
Filed July 21, 1951 2 Sheets-Sheet 1

INVENTOR
BERNARD E. O'CONNOR
by Hill, Sherman, Meroni, Gross & Simpson
Attys.

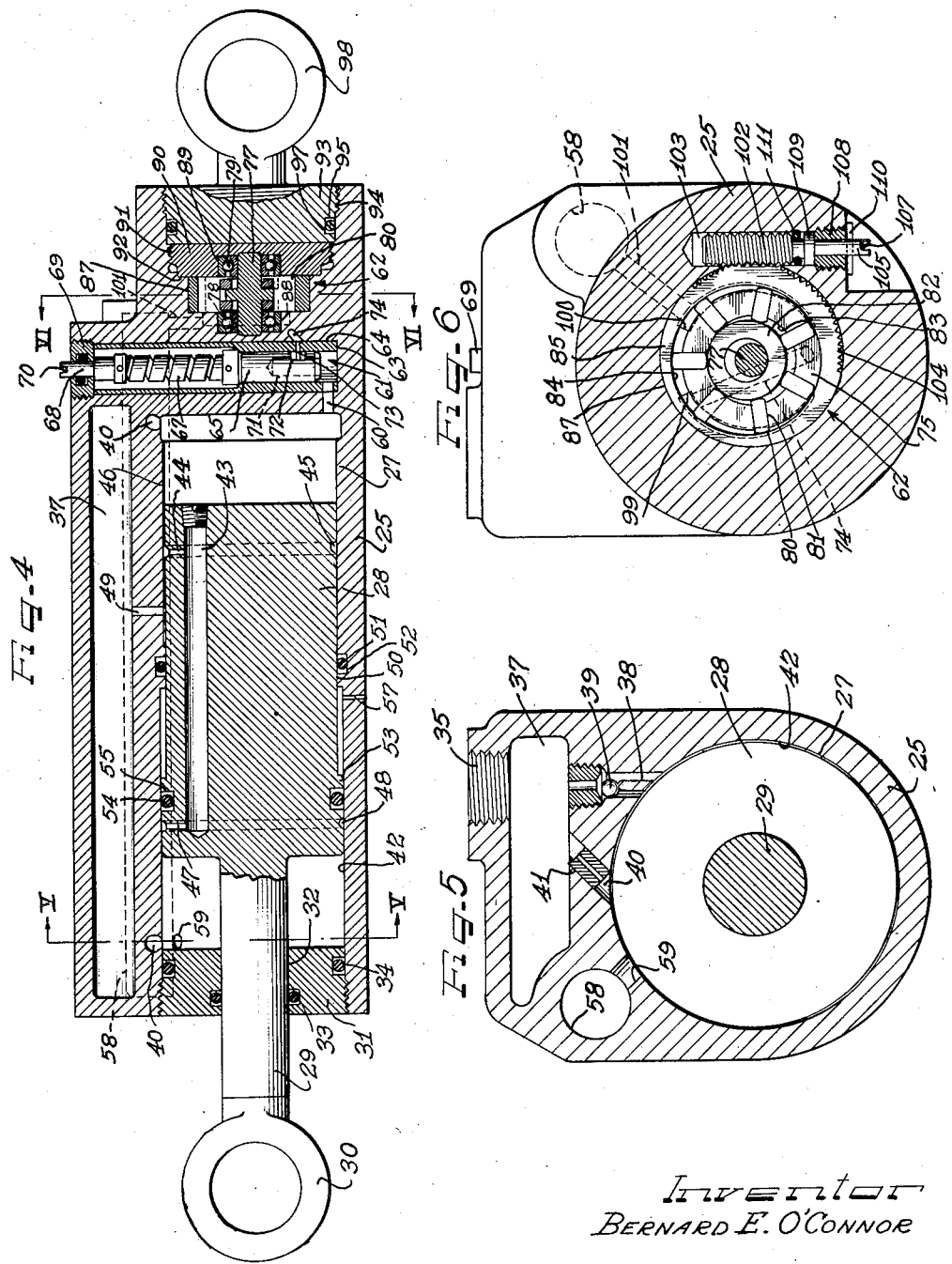

United States Patent Office 2,777,544
Patented Jan. 15, 1957

2,777,544

FREQUENCY SENSITIVE MECHANICAL DAMPING SYSTEM

Bernard E. O'Connor, Buffalo, N. Y., assignor to Houdaille Industries, Inc., a corporation of Michigan Application July 21, 1951, Serial No. 237,937

11 Claims. (Cl. 188—93)

The present invention relates to improvements in mechanical damping systems, and more particularly concerns certain significant innovations in the damping of vibration, and like undesirable relative movements of associated apparatus components, whether linear, or torsional, through the use of a fluid damping medium.

In shock absorbing and damping devices as heretofore known there have been certain inherent operating limitations and shortcomings that have been recognized as present, but to the best of my knowledge there has been no proper understanding of certain fundamental factors involved in the mechanism and in the fluid which, if properly calculated and related to the desired functionability of the system would point up some of the fundamental errors in all prior systems.

On of the basic misconceptions in the calculations used in prior damping systems, and more especially in hydraulic damping systems, has been to evaluate the hydraulic fluid as incompressible or of inconsequential elasticity when, as a matter of fact, it inevitably embodies sufficient inherent compressibility to afford a substantial and calculable functional factor except at very low frequencies.

A second major defect in prior calculations has been in not adequately or fully appreciating the elasticity factor in the apparatus of the system, such as the casings and pistons of the damper units.

Heretofore, in the design of mechanical damping systems it has been generally assumed that the damper was infinitely rigid in comparison with the other elasticities in the system and that the resisting force of the damper was a pure damping force which was proportional to the first or second power of the relative velocity across the damper terminals and was independent of the frequency of oscillation. It can be shown that in reality all fluid dampers display inherent elasticities and due to these elasticities the maximum effective damping force per unit velocity which may be exerted by a damper of a given elasticity at a finite frequency is at best exactly one half the effective damping force per unit velocity at zero frequency if the fluid inertia effect is negligible.

Since the proper relationship of fluid inertia and damper elasticity have not previously been considered, damping systems have been excessively heavy, stiff and resistant to normal movements when adequate damping was attained, especially for higher frequencies.

In view of these deficiencies of the prior art and in view of the fact that in most cases damping is desirable only over a limited range of frequencies, the weight, operating force and/or power requirements have been excessive in relation to the damping requirements.

I have discovered that by properly taking into consideration the inherent compressibility of the damping fluid and the elasticity of the housing and the mechanisms, related to the fluid in the operation of the damper system, and then utilizing in the system the functions of fluid inertia, a new era in damping by fluid displacement damping systems is opened.

It is, accordingly, a general object of the present invention to provide a mechanical damping system utilizing the principle of fluid inertia control for damping.

Another object of the invention is to provide a fluid operated damping system embodying a highly efficient relationship of fluid inertia to the over-all elasticity of the system.

A further object of the invention is to provide a fluid damped system which is frequency sensitive.

Still another object of the invention is to provide, in a fluid operated mechanical damping system, a fluid inertia controlled damping factor which is applicable to direct acting or rotary dampers.

Yet another object of the invention is to provide a fluid operated mechanical damping system of greatly improved operating capacity per unit volume or weight and with reduced normal operational resistances.

Still a further object of the invention is to provide, in a fluid operated mechanical damping system, an artificial fluid inertia device.

Yet further object of the invention is to provide adjustable artificial fluid inertia means for fluid operated mechanical damping systems.

Other objects, features and advantages of the present invention will be readily apparent from the following detailed description of certain exemplary embodiments thereof, taken in conjunction with the accompanying drawings, in which:

Figure 4 is a longitudinal sectional elevational view through a more or less schematically illustrated exemplary damper showing the invention applied in one practical form utilizing a novel artificial fluid inertia device;

Figure 5 is a transverse sectional view on an enlarged scale taken substantially on the line V—V of Figure 4; and Figure 6 is an enlarged transverse sectional elevational view taken substantially on the line VI—VI of Figure 4.

Shock absorbers or vibration dampers operating on the fluid displacement principle comprise, generally, a housing 10 (Fig. 1) defining an enclosure containing a fluid which in most instances, though not necessarily, comprises a liquid. For some purposes a gas such as air comprises the fluid.

Figure 1:
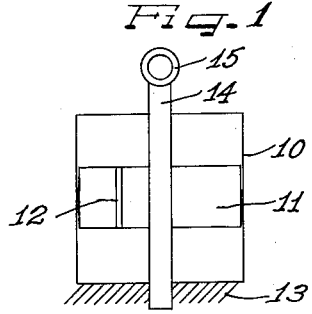
Figure 1 is a schematic view of a fluid operated damping system generally according to prior practice.

Within the chamber of the housing 10 is operable a piston 11, which is merely generically shown in Fig. 1 and it will be understood may comprise either a reciprocable piston or a rotary piston, and which, upon movement within the housing 10, effects fluid displacement through a restricted passage 12.

The housing 10 is operatively connected to one part or member of relatively movable apparatus or structures as indicated at 13, while the piston 11 is connected to a companion relatively movable member of the apparatus or structures by means of a piston rod 14 having connecting means 15 at one end thereof.

As conventionally constructed and operated, the housing 10 and the piston 11 are relatively movable in proportion to the restriction upon displacement of the damping fluid from one part of the damper system to the other part of the damper system through the restricted passage 12.

It will be understood that in the general sense in which the restricted passage 12 is considered for purposes of this discussion, it comprehends all of the various expedients that have been employed to effect restriction upon displacement of the fluid, and usually including not merely a single passage but a plurality of passages of varying restrictive capacities and provided with re-restrictive valves, check valves and the like.

Damping has therefore, in prior practice, depended entirely upon the resistance to rapid displacement of the fluid through the herein generically designated displacement passage 12 by mechanical restraint upon movement of the fluid therethrough.

This has required fairly massive damper structures in proportion to the amount of damping required. In addition, the prior dampers have necessarily been stiff and unduly resistant in normal operations because of the very close settings required in the restrictive fluid displacement passage arrangements in the systems.

I have discovered that by attacking the problem with what I believe to be a wholly new theory in the fluid displacement damper art, I greatly increase the actual shock absorption or damping work that the system can perform in proportion to the size of a given unit, and that I attain this increase in work capacity with actually far less resistance in the system during normal or non-damping relative movements of the housing and piston in the system.

Basically, I attain this by providing a housing 17 (Fig. 2) defining a chamber or enclosure within which is a damping fluid that is displaced from one part of the system to another by a piston 18 through a long passage 19. Through the passage 19 the fluid is displaced under conditions of predetermined or controlled inertia, and this factor is utilized in addition to any preferred restrictive control or velocity-increasing expedients heretofore employed.

Figure 2:
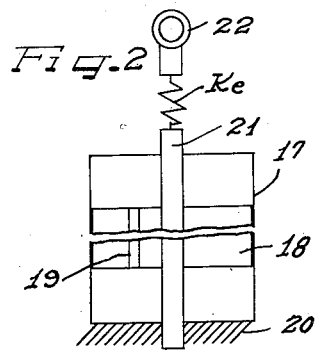
Figure 2 is a similar but fragmental schematic view showing a fluid operated mechanical damping system according to the present invention.

Stated in its simplest manner, therefore, damping according to my present invention is effected by utilizing the inertia of the damping fluid in passing through a long passage as displaced from one part to another part of the damper system in combination with the inherent elasticity of the system and any preferred restriction to fluid flow, to attain an entirely new result. It will be appreciated that to attain this result the passage 19 will have to be quite long in proportion to its cross-sectional flow area, and for this reason the schematically shown damper of Fig. 2 is indicated as fragmental, to represent the omission from the illustration of a portion of the system which, if illustrated on the same scale, would be substantially greater than, and possibly several times the length of, the portions actually illustrated.

It will be understood, of course, that similarly as in conventional dampers, the housing 17 will be attached to one part or member of a structure or apparatus as indicated at 20, while a piston rod 21 carried by the piston 18 will be attached as through the medium of attachment means 22, to a relatively movable companion member of the structure or apparatus in which shocks or vibrations are to be damped.

In calculating a damping system according to the present invention, to provide any given performance the various elasticities in the system due to fluid compressibility and other material elasticities may be considered as a single effective spring. The system may then be considered as containing a single spring $K_e$ (see Fig. 2) and an incompressible fluid.

The only part of the damper force which removes energy from the relatively vibrating components to which the damper is connected is that component of the force which lags the displacement by 90°. This component of the damper force is designated as $T_e$, or the effective damping force. The value of $T_e$ is a function of the frequency $\omega = 2\pi$ times the cycles per unit time; the effective spring constant $K_e$, the relative amplitude of displacement $a$; the effective inertia or mass of the fluid $M$, referred to the piston and the housing, where $M$ is a fuction of the piston area, the fluid passage area, the fluid passage length, and the fluid density, and the damping constant $C$, where $C$ may be described as the force per unit velocity at zero frequency. However, for analytical purposes it is preferred, rather than to use the term $T_e$ to utilize the term $C_e$, which is equal to $T_e$ divided by the frequency $\omega$ times the amplitude of displacement. $C_e$ is then the effective damping constant, i. e., the energy dissipating force per unit relative velocity of the terminals of the damping system, and is equal to $$C_e = \frac{T_e}{a\omega}$$

where $a$ is the maximum relative displacement of the terminals of the damping system, or, stated another way, across the entire damper.

The value of $C_e$ is then:

$$C_e = \frac{CK_e^2}{(K_e - M\omega^2)^2 + \omega^2 C^2}$$

and is valid throughout the range of $\omega$.

Aside from the damping force $T_e$, the damper will exert another force on the system. This force has the property of an inertia force below a given critical frequency, and of a spring force above this same critical frequency. We will call the constant of this spring force $K_q$ (i. e. the force per unit relative displacement of the system terminals which lags the relative displacement by 180°), and $K_q$ has the value:

$$K_q = \frac{-K_e[M\omega^2(K_e - M\omega^2) - \omega^2 C^2]}{(K_e - M\omega^2)^2 + \omega^2 C^2}$$

and is valid in the range $$\omega^2 > \frac{K_e M - C^2}{M^2}$$

The value of the inertia force below critical frequency is indicated as $I$, and $I$ has the value $$I = \frac{\frac{K_e}{\omega^2}[M\omega^2(K_e - M\omega^2) - \omega^2 C^2]}{(K_e - M\omega^2)^2 + \omega^2 C^2}$$

and is valid in the range $$\omega^2 < \frac{K_e M - C^2}{M^2}$$

Obviously, these two effects do not occur simultaneously.

By proper relationship between the parameters $K_e$, $M$ and $C$, a much greater value of $C_e$ at a given frequency may be obtained than would be possible in a design which did not specifically consider this relationship. Also, $C_e$ and the total damper force may be made small or large at specific frequencies to meet the requirements of a specific application.

$K_e$ is in general a function of the size and weight of a damper.

$C$ is, in general, readily adjustable.

$M$ has, until the present invention, been of a negligible value in known applications. It is, however, one of the most important parameters involved in the design of frequency sensitive dampers. In order to obtain large values of $M$ it is necessary that the fluid path be through a long passage of relatively small cross-sectional area, or the equivalent.

In arriving at the total harmonic force resisting relative motion between the terminals of the damper system, and which force may be identified as $T_T$, the following equation should be used:

$$T_T = \frac{aK_e\sqrt{[M\omega^2(K_e-M\omega^2)-\omega^2C^2]^2+(\omega CK_e)^2}}{(K_e-M\omega^2)^2+\omega^2C^2}$$

and the phase angle between $a$ and $T_T$ is:

$$\tan^{-1}\left(\frac{-\omega CK_e}{M_e\omega^2(K_e-M_e\omega^2)-\omega^2C^2}\right)$$

Figure 3:
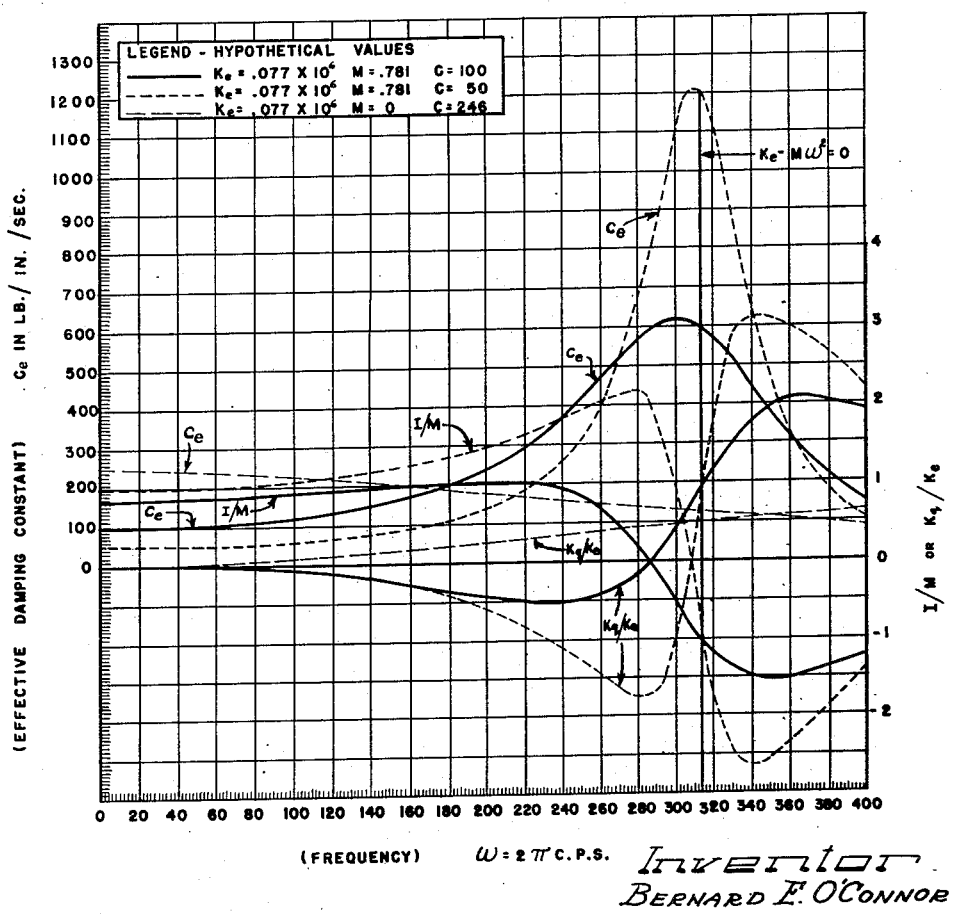
Figure 3 is a graph demonstrating certain results attained by use of the present invention.

In Fig. 3 are shown graphically the results accruing from certain conditions or relationships in damper systems, and with reference to the foregoing disclosure and discussion. The legend, hypothetical values and the identification of the several curves of the graph by symbols referenced to the foregoing mathematical explanations enable reading the several curves without further elaboration. However, especial attention is directed to the three curves identified as $C_e$ on the graph. These curves demonstrate spectacularly how a damper system embodying the present invention operates with greatly increased efficiency for damping high frequency movements or vibrations while a conventional system actually falls off or decreases in efficiency in the high frequency range.

It will be observed that while in a damper of the conventional kind wherein fluid inertia is not used and set for a force per unit velocity at zero frequency of 246 pounds ($C=246$ but $M=0$) and selected since with a zero fluid inertia, a zero frequency force per unit velocity of 246 pounds will give the highest possible damping constant when $\omega$ equals 312, and any other force per unit velocity at zero frequency will result in a lower effective damping constant when $\omega$ equals 312, the effective damping constant gradually dips lower as the frequency increases. In sharp contrast a damper according to the present invention set for but a damping constant of 50 pounds per unit velocity and utilizing a fluid inertia of but .781 with all other factors substantially the same shows a very rapid increase in effective damping as the frequency of vibration increases and is at substantially peak performance at a critical frequency of 314 vibrations per second, identified on the graph by the heavy vertical line $K_e-M\omega^2=0$. It will be observed by the solid curved line identified as $C_e$ that if the force per unit velocity at zero frequency is doubled, the effective damping constant at critical high frequency is diminished by almost half but that somewhat greater damping efficiency is attained in the lower frequency range.

While it may seem at first glance to be inconsistent to compare a conventional damper set for a damping constant at 246 pounds with a damper according to the present invention set for a damping constant of 50 pounds, this has been done deliberately since a comparison of peak performance of the two dampers at a critical frequency of 314 radians per second is desired to be shown in the graph of Figure 3. Thus a conventional damper set for 246 pounds and a damper according to the present invention set at 50 pounds will afford their respective peak effectiveness at the critical frequency at 314 radians per second or 50 vibrational cycles per second.

The curves identified on the graph of Fig. 3 as $K_a/K_e$ demonstrate the spring force in the damper systems under consideration, while the curves $I/M$ demonstrate the inertia force in the damper systems.

From the graphic performance curves of Fig. 3 will be readily appreciated the great versatility and adaptability of the present invention to meet various damping requirements, and especially where high frequency vibrations must be damped.

Since under some practical conditions it is desirable to reduce the actual length of the fluid inertia passage of the damper to a minimum, I provide for the introduction of an artificial fluid inertia into the passage by causing the fluid displaced by the piston to flow through a fluid motor of small fluid displacement. The end result is the same, however, as though an uninterrupted passage of suitable length were to be used.

For this purpose the effective value of the fluid mass is calculated as:

$$4I_m\pi^2\left(\frac{D_p}{D_r}\right)^2$$

where:

$D_p$=the displacement of the piston per unit stroke;
$D_r$=the displacement of the fluid motor per revolution; and
$I_m$=the moment of inertia of the fluid motor about its center of rotation.

Where an artificial fluid inertia motor is used the value of $C_e$ becomes:

$$C_e = \frac{CK_e^2}{(K_e-M_e\omega^2)^2+\omega^2C^2}$$

where:

$$M_e = M + 4I_m\pi^2\left(\frac{Dp}{Dr}\right)^2$$

Furthermore, in calculating a damper system having an artificial fluid inertia motor, to arrive at the total force $T_T$ resisting relative motion of the terminals of the system, the equation to be used is modified to:

$$T_T = \frac{aK_e\sqrt{[M_e\omega^2(K_e-M_e\omega^2)-\omega^2C^2]^2+(\omega CK_e)}}{(K_e-M_e\omega^2)^2+\omega^2C^2}$$

and the phase angle between $a$ and $T_T$ is:

$$\tan^{-1}\left(\frac{-\omega CK_e}{M_e\omega^2(K_e-M_e\omega^2)-\omega^2C^2}\right)$$

An exemplary embodiment of the invention in a damper including an artificial fluid inertia motor to reduce the length of the fluid inertia passage, is shown in Figs. 4, 5 and 6. This damper comprises a casing 25 of any preferred construction providing a hollow housing within which is a chamber 27 having operable therein a piston 28. In this exemplification, the piston 28 is of the reciprocably operable type although it will be appreciated that since the purpose of the piston is to displace fluid from one portion of the chamber 27 to another portion, it is a matter of choice whether the piston will be reciprocable or of the rotary type well known in this art. Therefore in a broad sense the piston 28 should be considered as generically representative of any preferred form of fluid displacing piston.

A piston rod 29 projects from one end of the piston 28 beyond one end of the chamber 27 and has suitable means attached thereto, such as a connector eye or knuckle 30 by which the piston is connected operatively to one portion of relatively movable apparatus in which vibrations or shocks are to be damped. Closing such end of the chamber 27 is a ring cap or plug 31 which is threaded into the end of the chamber and provides a bearing aperture 32 for passage of the piston rod. A bearing seal such as an O-ring 33 is preferably seated in the wall defining the bearing aperture 32. A fluid seal such as an O-ring 34 is also preferably seated in the external periphery of the inner end portion of the plug cap 31 to seal the interface area between the plug and the wall of the housing defining the chamber 27.

A filled hydraulic system is provided in the damper by filling the damper with hydraulic fluid, preferably under suitable pressure, from any suitable source through an inlet or supply opening 35 into a reservoir chamber 37 in preferably an upper portion of the housing 25 and communicating with the respective opposite ends of the pressure chamber 27. With each end of the chamber 27, pressure fluid supply communication with the reservoir 37 is effected through a similar respective supply port or duct 38 (Fig. 5) having therein a check valve 39 for preventing return flow of fluid from the piston chamber into the reservoir.

For constant air bleed-off from the ends of the piston chamber 27 to the reservoir 37, respective bores or ducts 40 are provided in the top wall at the opposite ends of the piston chamber and provided with respective restricted orifices 41. Through this arrangement, air is positively displaced from the piston chamber during operation of the piston 28 reciprocably in the housing 25.

In order to compensate for the displacement of the piston rod or shaft 29, that portion of the piston chamber through which the rod extends is preferably of larger diameter to provide larger cross sectional area than the opposite end portion of the piston or pressure chamber 27, as indicated at 42. In addition, the piston 28 has a passage 43 therethrough communicating through a laterally directed orifice 44 with an annular groove 45 in the peripheral surface of the piston adjacent to its inner end. At its opposite end the passage 43 communicates by way of a similarly restricted orifice 47 with a peripheral annular groove 48 adjacent to the piston rod end of the piston. The respective opposite end portions of the piston are in slidable relation to the cylindrical walls defining the respective encompassing portions of the piston chamber.

Further air bleed communication between the reservoir 37 and the piston chamber 27 occurs through a small passage or orifice 49 adjacent the outer end of the smaller diameter portion of the wall defining the piston chamber 27. The location of the orifice 49 is such that it will not be uncovered in the furthest protracted position of the piston 28 but will throughout the entire range of the piston be in partially blocked or metered control of the piston. However at all times bleed communication between the orifice 49 and the piston groove 45 perisists through a longitudinal metering groove 46, which may be no more than a scratch in the wall of the chamber 27. As a result of the air bleed-off afforded by the orifice 49 in conjunction with the bleed orifices 40, air bleed-off will be continuous in both working chambers of the cylinder for any angle of the piston axis relative to the horizontal.

Adjacent an annular land or bearing portion 50 at the outer end of the smaller diameter portion of the chamber 27 is provided an annular packing or fluid sealing structure such as an O-ring 51 mounted in an annular groove 52. The piston 28 is provided on its outer end portion with a short annular radially outwardly extending land or bearing portion 53 which slidably engages with the cylindrical wall defining the enlarged piston chamber portion 42 and has an annular O-ring sealing member 54 mounted in an annular groove 55 adjacent its inner end.

The respective bearing portions 50 and 53 are so relatively disposed in an axial direction that a full range of reciprocal movement of the piston is permitted, and the clearance area about the piston between the bearing portions is vented to atmosphere through an orifice 57.

It will be appreciated that since leakage past the piston is for all practical purposes eliminated and since displacement between the piston chamber 27 and the reservoir 37 is extremely restricted, as is also displacement through the piston by way of the air bleed passage 43, only very slow and restrained movement may result from such fluid displacement.

For operation of the damper with minimum resistance at zero vibrational frequency, but high and increasing efficiency as the vibrational frequencies that must be damped increase, a fluid displacement passage 58 of relatively large cross sectional flow area and low flow restriction is provided to extend from adjacent to the piston rod end of the chamber 27 to a point substantially beyond the inner end of the piston chamber within the housing 25. Communication of the passage 58 with that end of the chamber 27 through which the piston rod 29 extends is effected through a port 59 of substantial size and low restriction upon fluid flow. At the opposite end, the displacement passage 58 communicates with the inner end portion of the piston chamber 27 through a port 60 of substantial size leading into a passageway that includes restrictive control orifice means 61 and an artificial fluid inertia motor 62.

The restrictive orifice means 61 may comprise an adjustable valve mechanism including a sleeve 63 fitted into a bore 64 transversely in the housing 25 spaced beyond the inner end of the chamber 27 and having communication adjacent its inner end with the chamber 27 through the port 60. Mounted rotatably in the sleeve 63 is a rotary valve cylinder 65 connected by means of a bimetallic spiral thermostat 67 to a stem 68 which projects out of a retaining and closure plug 69 so that the valve can be adjusted by turning the stem 68 as by means of a screwdriver engaging in end screwdriver slot 70 in the tip of the stem.

The valve member 65 has a blind end bore 71 opening from the inner end thereof while a radial orifice 72 in the wall of the valve member intersects the bore 71 and registers with an orifice slit 73 opening radially through the sleeve 63 and communicating with a branch passage 74. Through this arrangement, adjustment of the valve 65 with relation to the orifice slit 73 will determine the resistance to displacement of fluid through the orifice. The bimetallic thermostat 67 effects automatic orifice adjustment for temperature changes.

The fluid inertia motor 62 is desirably of the rotary vane type. For the present purpose this type of motor is highly efficient since a motor unit of small diameter and thus small fluid displacement will serve as a substitute for or take the place of a fluid inertia passage or portion of such a passage of considerable length. To this end, the motor 62 (Figs. 4 and 6) comprises a rotor 75 having an axle or oppositely extending trunnions 77 journaled in respective antifriction bearings 78 and 79 whereby the rotor is freely rotatable. A plurality of equally spaced radial vanes 80 are slidably disposed in radial slots 81 opening through the periphery of the rotor and are maintained by spreader rings 82 acting against their inner ends within respective side grooves 83 in the rotor to act against the inner ends of the vanes, in normally radially thrusting slidable bearing engagement against a circular wall 84 defining a motor chamber within a modulator ring 85. The chamber wall 84 is of larger diameter than the rotor 75 and is disposed eccentrically within the modulator ring 85. The modulator ring 85 has the outer circular periphery thereof of larger diameter than the internal chamber wall 84 and arranged eccentrically to the chamber wall and in slidable bearing engagement within a circular bearing wall 87 defining a motor chamber recess within the end portion of the housing 25 beyond the inner end of the damper piston chamber or cylinder 27 and preferably outwardly beyond the control valve bore 64.

A recess 88 of smaller diameter at the inner end of the motor recess accommodates the bearing 78. The opposite or outer end bearing 79 is accommodated within a bearing recess 89 within a closure disk member 90 of larger diameter than the motor chamber bearing wall 87 and secured within a counterbore 91, as by threading the same thereinto, a limit shoulder 92 affording a close slidable sealing bearing for the outer side of the motor components including the rotor 75, the vanes 80 and the modulator ring 85, while the opposite or inner side of the motor is in substantially fluid sealing slidable bearing engagement with the inner wall defining the motor recess. The closure and bearing disk 90 is locked in place by an end closure plug 93 having the inner end drive against the disk member 90 as by threading the plug member thrustingly into a slightly larger outer counterbore 94. A fluid sealing packing preferably in the form of an O-ring 95 is preferably provided in an annular peripheral groove 97 in the inner end portion of the plug 93 and engaging an inner unthreaded cylindrical portion of the counterbore 94. The plug 93 may also serve as means for connecting the damper to one of the portions or components of the relatively movable devices or apparatus between which the damper is connected and for this purpose the plug may be provided with an attachment eye portion 98.

Operative fluid connection of the motor 62 within the fluid inertia passageway is effected by having the branch passage 74 which communicates with the control valve 61, also communicate with a fluid port 99 opening into the inner side of the motor chamber from the inner end wall defining such chamber. Connection of the motor within the fluid inertia passageway is completed by having a second port 100 in the inner end wall defining the motor chamber connected to the passage 58 through the medium of a branch passage 101.

As best seen in Fig. 6, the ports 99 and 100 are each of generally arcuate form and of diminishing cross section from one end to the other. Both of the ports 99 and 100 are preferably of identical dimensions and they are relatively disposed with the larger ends thereof in proximate spaced relation and with the smaller ends thereof also in proximate spaced relation. As shown, the spacing between the larger ends of the ports 99 and 100 is approximately the same as the on center spacing between adjacent ones of the slidable vanes 80.

The inner diameters of the ports 99 and 100 are preferably disposed concentric with the rotor 75 and substantially aligned with the periphery of the rotor. On the other hand, the outer walls defining the ports 99 and 100 are preferably arranged to be substantially concentric with the circular pump chamber internal wall 84 of the modulator ring when the modulator ring is adjusted to maximum eccentricity of the motor chamber with reference to that portion of the rotor located proximate the larger ends of the ports 99 and 100.

In the operation of the fluid motor 62, when the adjustment of the modulator ring 85 is as shown in Fig. 6, substantially equal artificial fluid inertia is imposed upon the fluid passing through the fluid inertia passageway in either direction as displaced between the opposite end portion of the cylinder 27 by the piston 28. Since the fluid displacement of the motor is equal with respect to the driving force of the fluid under displacement, pressure from either of the ports 99 and 100 to the other to impel the rotor 75 to turn by action of the fluid on the respective vanes 80 within the pockets defined by the vanes at the ports.

It should here be understood that the ports 99 and 100 are not fluid restricting areas and that since the center of the rotor and the ports is the same constant center, the port areas 99 and 100 will be equal to each other for all adjustments of the modulator.

In order to provide for adjustment of the modulator 85 to reduce the displacement through the motor and thus increase the inertia of the displaced fluid, means are provided enabling turning of the modulator ring 85 from the outside of the casing 25. To this end an adjustment worm member 102 is accommodated within a bore 103 substantially tangentially intersecting the modulator ring and meshing with gear or worm teeth 104 on at least a portion of the outer periphery of the modulator. A manipulating stem 105 projects from the outer end of the worm 102 and has means such as a screwdriver slot 107 by which the outer end portion may be manipulated to turn the adjustment worm 102. A closure plug 108 in the outer end of the blind end bore 103 provides a bearing for the stem 105. The longitudinal displacement of the worm 102 is avoided by a collar 109 on the stem 105 at the inner end of the plug 108 and a retaining pin 110 on the outer end portion of the stem 105 at the outer end of the plug 108 and preferably also serving as an index pointer to show, with respect to any preferred index means or indicia at the outside of the casing 25 about the stem 105, the particular adjustment of the worm 102 and thereby the modulator ring 85. Sealing means such as an O-ring 111 may be provided about the inner end portion of the worm adjustment stem and the wall defining the surrounding portion of the bore 103. It will thus be evident that the inertia motor 62 can be accurately adjusted for attaining a substantial range of fluid inertia response in the displacement passageway of the damper to meet a wide variety of operating conditions and especially in a wide range of frequency-sensitive requirements.

By the use of a fluid motor, such as described, in a damping system, not only can the total length of the passage through which the fluid is displaced be relatively short while nevertheless securing the advantages of a long passage, but adjustments can be effected to obtain various damping effects such as a relatively great value of effective damping constant over a predetermined frequency range while resistance to motion remains relatively small at other frequencies.

Where the damper utilizes an effective inertia according to the present invention, the damper system will in effect act as a pure damper and a pure spring or inertia in parallel, the values of which may be made relatively and individually large or small, including negative values of the spring constant or the inertia, over any desired frequency range within the capacity of the damper.

The substantial effective mass of fluid in the inertia passageway added to the fluid at the opposite sides of the piston, as taught herein, cooperates with the elasticity of the system to develop a resonant frequency in the damper during operation in a selected frequency range. This causes displacement movement of the fluid during the selected frequency vibrations through the energy absorbing and thus vibration damping fluid restriction or metering means in or associated with the displacement passage. In a damper not equipped with the fluid inertia feature of the present invention the elasticities of the system permit elastic motion rather than energy absorbing fluid displacement at relatively high frequency for any given damping system.

Whereas the mathematical relationships expressed herein are for practical reasons based on linear differential equations, it is to be understood that they are approximately correct for actual systems which might have non-linear components. It is customary that actual systems be represented in this manner, in view of the great mathematical complexities involved in calculating the non-linear components of minor importance.

It will be understood that modifications and variations may be effected without departing from the scope of the novel concepts of the present invention.

I claim as my invention:

1. A mechanical vibration damper comprising, in combination, means defining a housing having a chamber therein, a piston operable in the chamber to displace fluid from one portion of the chamber to another portion of the chamber, and means defining fluid displacement passageway between the portions of the chamber, said passageway having therein throttling valve structure for imposing restriction upon passage of the displaced fluid through the passageway and also having therein an artificial fluid inertia motor operative to impose a substantial effective fluid mass compensating for the elasticities in the system.

2. A mechanical damping system comprising, in combination, a housing having room therein for displacement of fluid from one area to another, a piston operable in the housing to effect displacement of the fluid responsive to relative movements of the piston and housing, means defining a passageway through which the fluid is adapted to be displaced by operation of the piston, energy-absorbing fluid flow restricting means in said passageway, and an artificial inertia device in said passageway rotatable about a fixed center of revolution and acting in cooperation with the elasticity of the system to develop a resonant frequency in the damper during operation in a selected frequency range, the total force resisting relative motion between the housing and piston being predetermined by the equation:

$$T_T = \frac{aK_e\sqrt{[M_e\omega^2(K_e - M_e\omega^2) - \omega^2 C^2]^2 + (\omega C K_e)^2}}{(K_e - M_e\omega^2)^2 + \omega^2 C^2}$$

where:

$T_T$ = the total harmonic force resisting relative motion between the damper terminals,
$a$ = the maximum relative displacement across the damper terminals,
$C$ = the force per unit relative velocity of the terminals of the system at zero frequency,
$K_e$ = the effective spring constant (i. e., the force per unit relative displacement of the terminals of the system when the passage is closed so that no fluid may flow. This constant is a function of fluid compressibility and all other material elasticities in the system),
$M$ = the effective inertia of the fluid referred to the piston and housing,
$\omega$ = the frequency of the oscillations to be damped (i. e., $2\pi$ times the cycles per unit time), and $$M_e = M + 4I_m\pi^2\left(\frac{D_p}{D_r}\right)^2$$

where:

$D_p$ = the displacement of the piston per unit stroke,
$D_r$ = the displacement of the fluid motor per revolution,
$I_m$ = the moment of inertia of the fluid inertia device about the center of revolution of the device, and the phase angle between $a$ and $T_T$ is:

$$\tan^{-1}\left(\frac{-\omega C K_e}{M_e\omega^2(K_e - M_e\omega^2) - \omega^2 C^2}\right)$$

3. A mechanical damping system comprising, in combination, a housing having room therein for displacement of fluid from one area to another, a piston operable in the housing to effect displacement of the fluid responsive to relative movements of the piston and housing, means defining a passageway through which the fluid is adapted to be displaced by operation of the piston, energy-absorbing fluid flow restricting means in said passageway, and artificial fluid inertia motor means in said passageway, the damping system meeting the relationships included in the equation:

$$K_q = \frac{-K_e[M_e\omega^2(K_e - M_e\omega^2) - \omega^2 C^2]}{(K_e - M_e\omega^2)^2 + \omega^2 C^2}$$

where:

$K_q$ = the resultant spring constant of the system (i. e., the force per unit relative displacement of the system terminals which lags the relative displacement by 180°),
$K_e$ = the effective spring constant (i. e., the force per unit relative displacement of the terminals of the system when the passage is closed so that no fluid may flow. This constant is a function of fluid compressibility and all other material elasticities in the system),
$\omega$ = the frequency of the oscillations to be damped (i. e., $2\pi$ times the cycles per unit time),
$C$ = the force per unit relative velocity of the terminals of the system at zero frequency, and $$M_e = M + 4I_m\pi^2\left(\frac{D_p}{D_r}\right)^2$$

where:

$M$ = the effective inertia of the fluid referred to the piston and housing,
$D_p$ = the displacement of the piston per unit stroke,
$D_r$ = the displacement of the fluid motor per revolution,
$I_m$ = the moment of inertia of the fluid motor about its center of revolution.

4. A mechanical damping system comprising, in combination, a housing having room therein for displacement of fluid from one area to another, a piston operable in the housing to effect displacement of the fluid responsive to relative movements of the piston and housing, means defining a passageway through which the fluid is adapted to be displaced by operation of the piston, energy-absorbing fluid flow restricting means in said passageway, and artificial inertia fluid motor means in said passageway, the damping system meeting the relationships included in the equation:

$$I = \frac{\frac{K_e}{\omega^2}[M_e\omega^2(K_e - M_e\omega^2) - \omega^2 C^2]}{(K_e - M_e\omega^2)^2 - \omega^2 C^2}$$

where:

$I$ = the resultant inertia across the terminals of the system,
$K_e$ = the effective spring constant (i. e., the force per unit relative displacement of the terminals of the system when the passage is closed so that no fluid may flow. This constant is a function of fluid compressibility and all other material elasticities of the system).
$\omega$ = the frequency of the oscillations to be damped (i. e., $2\pi$ times the cycles per unit time),
$C$ = the force per unit relative velocity of the terminals of the system at zero frequency, $$M_e = M + 4I_m\pi^2\left(\frac{D_p}{D_r}\right)^2$$

where:

$M$ = the effective inertia of the fluid referred to the piston and housing,
$D_p$ = the displacement of the piston per unit stroke,
$D_r$ = the displacement of the fluid motor per revolution,
$I_m$ = the moment of inertia of the fluid motor about its center of revolution.

5. In combination in a mechanical vibration damping system, means providing a housing having a piston chamber therein, a piston movably operable relative to said housing within said chamber, said piston and said chamber being proportioned and cooperatively related to afford fluid areas separated by the piston, the housing having a passageway connecting said areas for displacement of fluid between the areas by operation of the piston, an artificial fluid inertia motor in said passageway, and means accessible externally of the housing for adjusting said motor.

6. In combination in a mechanical vibration damping system, means providing a housing having a piston chamber therein, a piston movably operable relative to said housing within said chamber, said piston and said chamber being proportioned and cooperatively related to afford fluid areas separated by the piston, the housing having a passageway connecting said areas for displacement of fluid between the areas by operation of the piston, and an artificial fluid inertia motor in said passageway for controlling the flow of displaced fluid, said motor comprising means defining a circular chamber having a port thereinto from said passageway and another port leading therefrom to said passageway, to incorporate the chamber as part of the passageway and a rotor mounted eccentrically in the chamber and having sliding radial vanes cooperating with the circular wall defining the chamber to control displacement of fluid through the motor chamber.

7. In combination in a mechanical vibration damping system, means defining a housing having a piston chamber therein, a piston operable in the chamber and dividing the chamber into separated fluid areas, means defining a passageway for displacement of fluid between said areas by operation of the piston, and means in said passageway comprising an artificial fluid inertia motor of the rotary fluid displacement type including a modulator member for adjusting fluid displacement through the motor to vary the effective damping constant of the damping system.

8. In combination in a mechanical vibration damper, means defining a housing having a piston chamber therein, a piston in said chamber relatively movable with respect to the housing and dividing the chamber into separate fluid areas, the housing having a fluid reservoir communicating with said areas to maintain a closed fluid pressure system, means for connecting the housing to one portion of a relatively movable structure and means for connecting the piston to another portion of the relatively movable structure in which vibrations are to be controlled, means communicating with the chamber areas for displacement of fluid therebetween in response to relative movements of the piston and housing, and means for controlling the flow of the displaced fluid through the passage comprising a radial vane rotary artificial fluid inertia motor including a modulator defining a pump chamber and a worm for adjusting the modulator having means externally of the housing for adjusting the worm, the modulator having teeth thereon engaged by the worm for adjusting the modulator to adjust displacement of the fluid through the motor.

9. A mechanical vibration damping system comprising a housing having a chamber therein, a piston operable in said chamber to displace fluid in said chamber from one side of the piston to the other side thereof, means defining an elongated passageway for fluid displacement between opposite sides of said piston by operation of said piston within said chamber, said passageway having variable orifice energy-absorbing fluid displacement restriction means therein, variable upon variations in temperature, and also having an artificial inertia device therein providing a substantial inertia mass cooperating with the system elasticity and the fluid to provide a high effective damping constant in a predetermined range of frequency vibrations in the system and a low damping constant above and below the predetermined frequency range of vibrations.

10. In a frequency sensitive mechanical vibration damper, a piston, an enclosure within which said piston is operably movable and providing chamber areas on opposite sides of said piston confining a damping fluid, and means connected with the enclosure and communicating with the chamber areas for displacement of the fluid under piston-created force in either direction with respect to said chamber areas, said means including fluid restrictive structure for resisting vibratory movements of the piston relative to the enclosure and comprising a fluid inertia passage structure affording a fluid passageway proportioned with respect to the damper components so that the length of the passageway is equal to substantially the over-all spring constant of the damper divided by the square of $2\pi$ times the cycles per second of disturbing vibration times the acceleration of gravity, times the area of the passageway, all divided by the square of the piston area times the weight per unit volume of the fluid.

11. In a frequency sensitive mechanical vibration damper, a piston, an enclosure within which the piston is operably movable and providing chamber areas on opposite sides of the piston confining the fluid, and means connected with the enclosure and communicating with the chamber areas for displacement of the fluid under piston-created force in either direction with respect to said chamber areas, said means including a variable orifice fluid restrictive valve structure for resisting vibratory movements of the piston relative to the enclosure, thermostatic means for varying the orifice of said valve structure to compensate for variations in temperature ranges to which the damper is subjected, and a fluid inertia passage structure cooperating with said restrictive valve structure and affording a fluid passageway proportioned with respect to the damper components so that the length of the passageway is equal to substantially the over-all spring constant of the damper divided by the square of $2\pi$ times the cycles per second of the disturbing vibration times the acceleration of gravity, times the area of the passageway all divided by the square of the piston area times the weight per unit volume of the fluid.

References Cited in the file of this patent

UNITED STATES PATENTS

| | | |
|---|---|---|
| 101,681 | Towle | Apr. 5, 1870 |
| 1,202,082 | McCorkle | Oct. 24, 1916 |
| 1,409,849 | Haeberlein | Mar. 14, 1922 |
| 1,461,256 | Thompson | July 10, 1923 |
| 1,492,328 | Lang | Apr. 29, 1924 |
| 1,494,135 | Robinson et al. | May 13, 1924 |
| 1,685,081 | Brady | Sept. 25, 1928 |
| 1,928,430 | Lindgren | Sept. 26, 1933 |
| 2,065,832 | Spyker | Dec. 29, 1936 |
| 2,334,340 | Magrum | Nov. 16, 1943 |
| 2,363,867 | Isely | Nov. 28, 1944 |
| 2,670,812 | Custie | Mar. 2, 1954 |

FOREIGN PATENTS

| | | |
|---|---|---|
| 546,236 | France | Nov. 3, 1922 |